(No Model.)

O. T. HUEBENER.
FLOAT AND SINKER SECURING DEVICE.

No. 582,788. Patented May 18, 1897.

Witnesses:   Inventor:
C. Emlen Urban.   Obadiah T. Huebener,
Fred P. Mentzer.   By Dan'l H. Herr,
   Attorney.

UNITED STATES PATENT OFFICE.

OBADIAH T. HUEBENER, OF LANCASTER, PENNSYLVANIA.

FLOAT OR SINKER SECURING DEVICE.

SPECIFICATION forming part of Letters Patent No. 582,788, dated May 18, 1897.

Application filed October 2, 1896. Serial No. 607,660. (No model.)

*To all whom it may concern:*

Be it known that I, OBADIAH T. HUEBENER, a citizen of the United States, residing at Lancaster, in the county of Lancaster and State of Pennsylvania, have invented certain new and useful Improvements in Devices for Securing Floats or Sinkers to Fishing-Lines; and I do hereby declare the following to be a full, clear, and exact description of the invention, such as will enable others skilled in the art to which it appertains to make and use the same.

This invention relates to improvements in a fishing-line float or sinker of that class which may be readily attached to a fishing-line without resorting to either end thereof and in which provision is made whereby said float or sinker may be readily moved to a higher or lower position on said line and held in place.

The object of the invention is the production of a simple device to be inserted into the ends of a float or sinker, whereby said float or sinker may be readily attached to a fishing-line and readily moved to and securely held in any desired position, as well as taken therefrom, when said line is mounted on a reel or otherwise secured to a rod and without removing the hook.

The elements of the invention will at large appear in the following description, as well as set forth in the claims.

The purposes of the invention are attained by the means and devices illustrated in the accompanying drawings, in which similar reference letters and numerals designate like parts throughout the several views, and in which—

Figure 1:
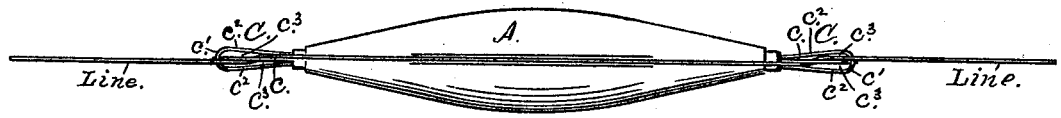
Figure 2:
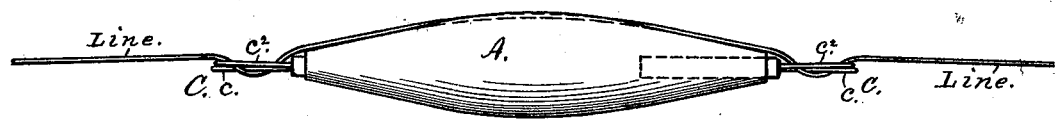
Figure 3:
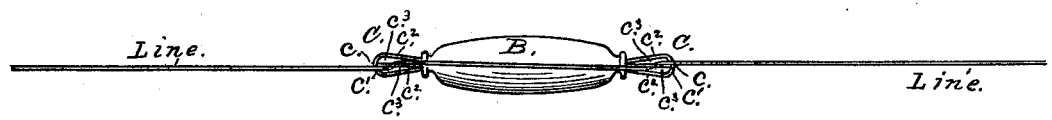
Figures 4, 5:
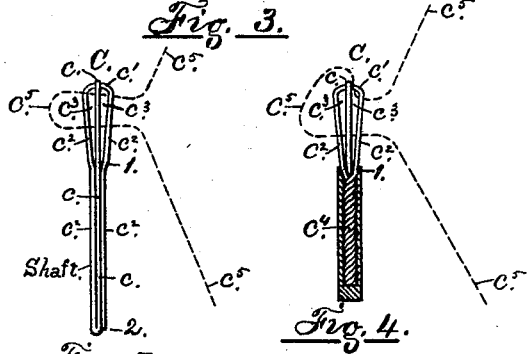

Figure 1 is a plan of a fishing-line float having the elements of the invention secured into the ends thereof in position on a taut portion of said line; Fig. 2, a view from below of Fig. 1; Fig. 3, a plan of the device, on a reduced scale, secured into the ends of a sinker with a portion of a fishing-line to which said sinker is attached; Fig. 4, a plan of the prong side of the device as it appears in position in a central longitudinal section of the usual end pin detached from the float, with a dotted line showing one side of the line-loop as having been passed under the prong; and Fig. 5, a plan of the arrangement of a piece of wire from which the device is formed, with a dotted line showing how the line-loop is first passed into position thereon.

As will be seen in the drawings, the invention consists in making and securing into the ends of a fishing-line float A or of a sinker B a buckle-like loop or fold C, somewhat oblong in form, having a yielding or resilient prong $c$, with one end rigidly secured thereto acting somewhat like the tongue to a buckle, whereby said float or sinker may be affixed to a fishing-line, moved up or down thereon, and removed therefrom, all without detaching said line from either reel or rod or taking off its hook or snood, while the production of said buckle loop or fold, being the device of the invention, constitutes its spirit or chief feature.

Now in the production of the device a piece of wire is arranged as shown in Fig. 5. It will here be seen that the buckle-like loop or fold C is practically oblong in form, having a curved cross-bar $c'$ at its upper end, with its side arms or bars $c^2$ made downwardly and inwardly approaching to the point 1, where they are a prescribed distance apart, thence continued in parallel lines a prescribed distance to the point 2, where one of the bars is turned upwardly in a return-fold, passing between said bars, and continued to the top of the loop, where its upper end rests against the side of the cross-bars $c'$, constituting the tongue or prong $c$, before mentioned, leaving a V-shaped opening $c^3$ on each side thereof and having the narrow end or apex of the V adjacent to the point 1, as shown, and the upper portion to the point 1 being held in place, as in a suitable vise or grip, (not shown,) while the lower portion to the point 2 is twisted, forming a three-split screw $c^4$, constituting a shaft of spindle end whereby the device may be secured into the end of a prescribed pin or stick (see Fig. 4) and inserted into the float ends, Figs. 1 and 3, or as is plainly indicated by dotted lines $c^5$ in Fig. 2.

When so desired, the stick may be omitted and the shaft $c^4$ inserted directly into the float end, and any tenacious glue, such as is produced from boiling shellac and caoutchouc together, may be used to secure it in place.

In the construction of the sinker B two of the devices may have their shaft ends screwed axially into the ends of the metal body, or they may be placed in the mold as a core is put in position with their shaft ends $c^4$ extending into the matrix and the metal poured therein, thus securing them in place at the time of casting.

Now the several parts hereinbefore described occupying the several positions indicated in the drawings, an inspection thereof clearly shows, first, that the float or sinker may be affixed to a fishing-line without resorting to the ends thereof by passing a loop of said line through one opening $c^3$, as shown in Fig. 5, then passing one side of said loop under the prongs $c$ into the other opening $c^3$, as shown in Fig. 4, and again detached with equal facility by reversing said operation; second, that when the line is drawn taut, as from a pull on both ends, it passes over the tongue $c$ in a long even fold, avoiding a short turn or bend liable to break or cut the line, as from a strong pull or sudden jerk; third, that by reason of this free passage of the line through the buckle-loops C, as shown, said float or sinker may be readily moved up or down to any desired position without removing any part; fourth, that a pull on either end of the line will draw it into the V-opening $c^3$ on the opposite end of the float or sinker and firmly hold it in place; fifth, that the device is neat in appearance, simple, but effective, in operation, and made practically from one continuous piece of wire, and, sixth, that the device may be made separately as an article of manufacture which may be readily attached to any float or sinker now on the market.

Having thus ascertained and described the invention and shown the manner in which it performs its functions, what is considered new, and desired to be secured by Letters Patent, is—

1. As an article of manufacture the hereindescribed buckle end for a fishing-line float or sinker comprising an oblong loop or fold, made from a continuous piece of wire, having an upper end cross-bar, with downwardly and inwardly approaching side bars and a fixed tongue or prong between them, forming a V-shaped opening on each side thereof, said side bars and prong twisted together into a three-split screw as shown, all substantially as and for the purpose hereinbefore set forth.

2. The combination in a fishing-line float or sinker, with a body of said float or sinker of the buckle-like loop or fold C having its three-split screw $c^4$ or shaft secured into each end thereof, said loop or fold having the upper end cross-bar $c'$, with the downwardly and inwardly approaching side bars $c^2$, and the tongue or prong $c$ between them, said tongue having its lower end rigidly secured to said shaft and its upper end resting against a side of said cross-bar $c'$, with the V-shaped openings $c^3$ $c^3$, one being on each side of said tongue, all substantially as described and for the purpose hereinbefore set forth.

In testimony whereof I affix my signature in presence of two witnesses.

OBADIAH T. HUEBENER.

Witnesses:
A. F. SHENCK,
DANIEL H. HERR.